Aug. 28, 1928.
F. M. LEWIS
1,682,386
DIFFERENTIAL MECHANISM
Filed April 23, 1927  4 Sheets-Sheet 1
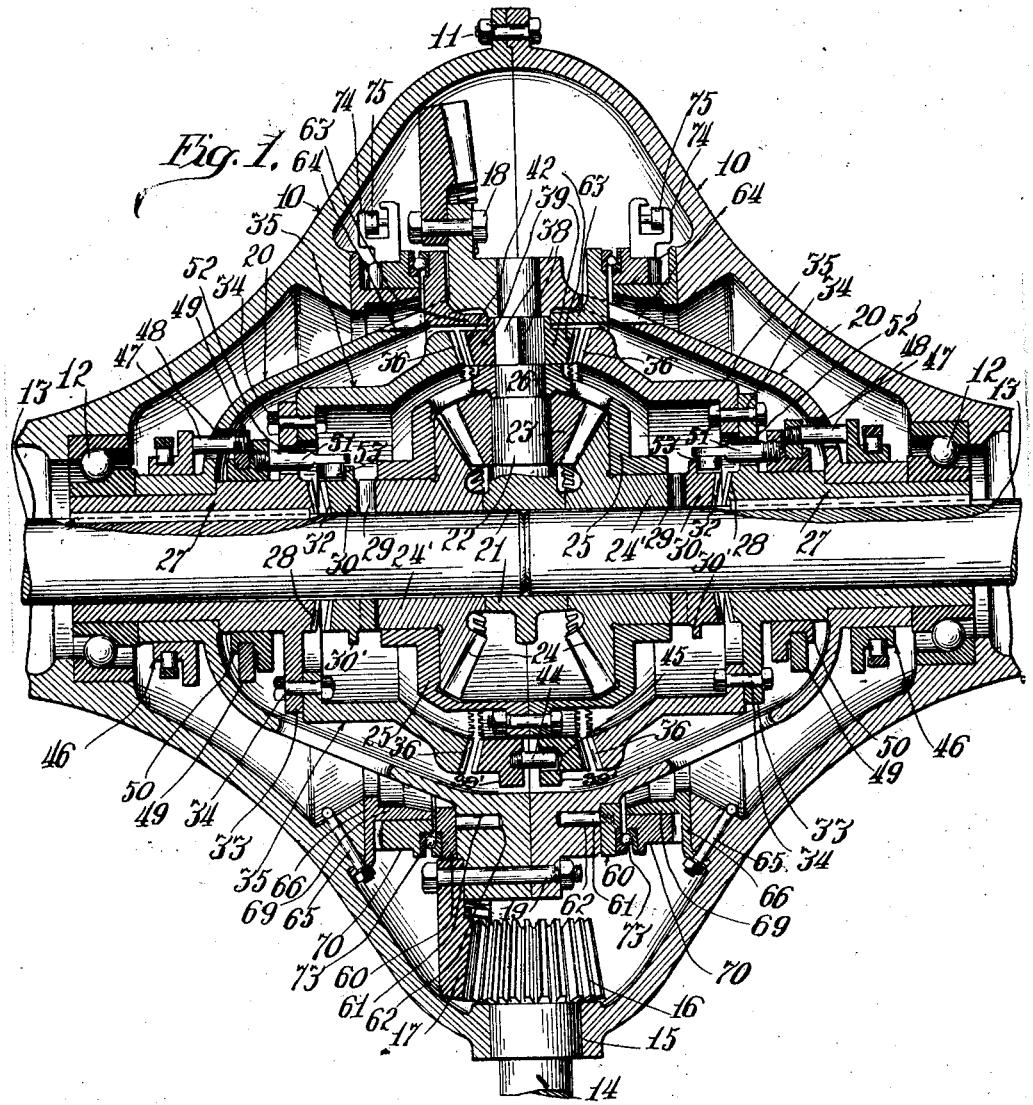
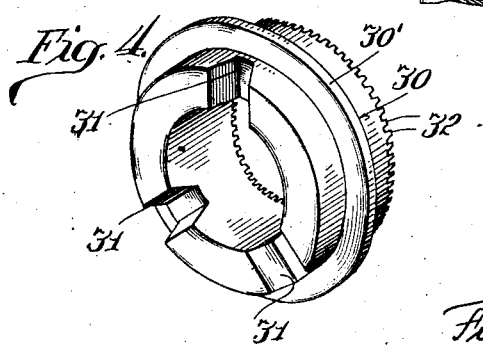
Inventor
Frank M. Lewis
By Fisher, Towle, Clapp & Soans,
Attorneys

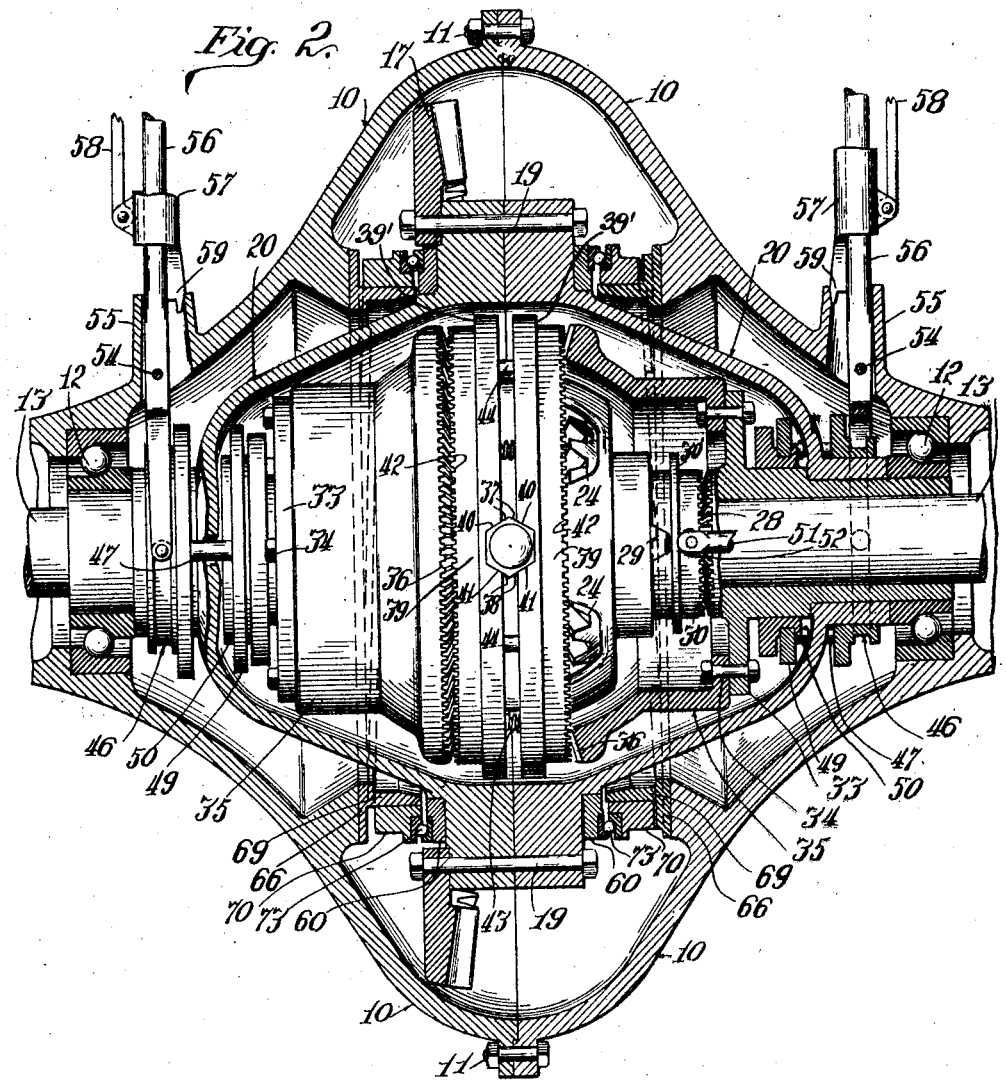

Aug. 28, 1928.
F. M. LEWIS
DIFFERENTIAL MECHANISM
Filed April 23, 1927      4 Sheets-Sheet 3
1,682,386
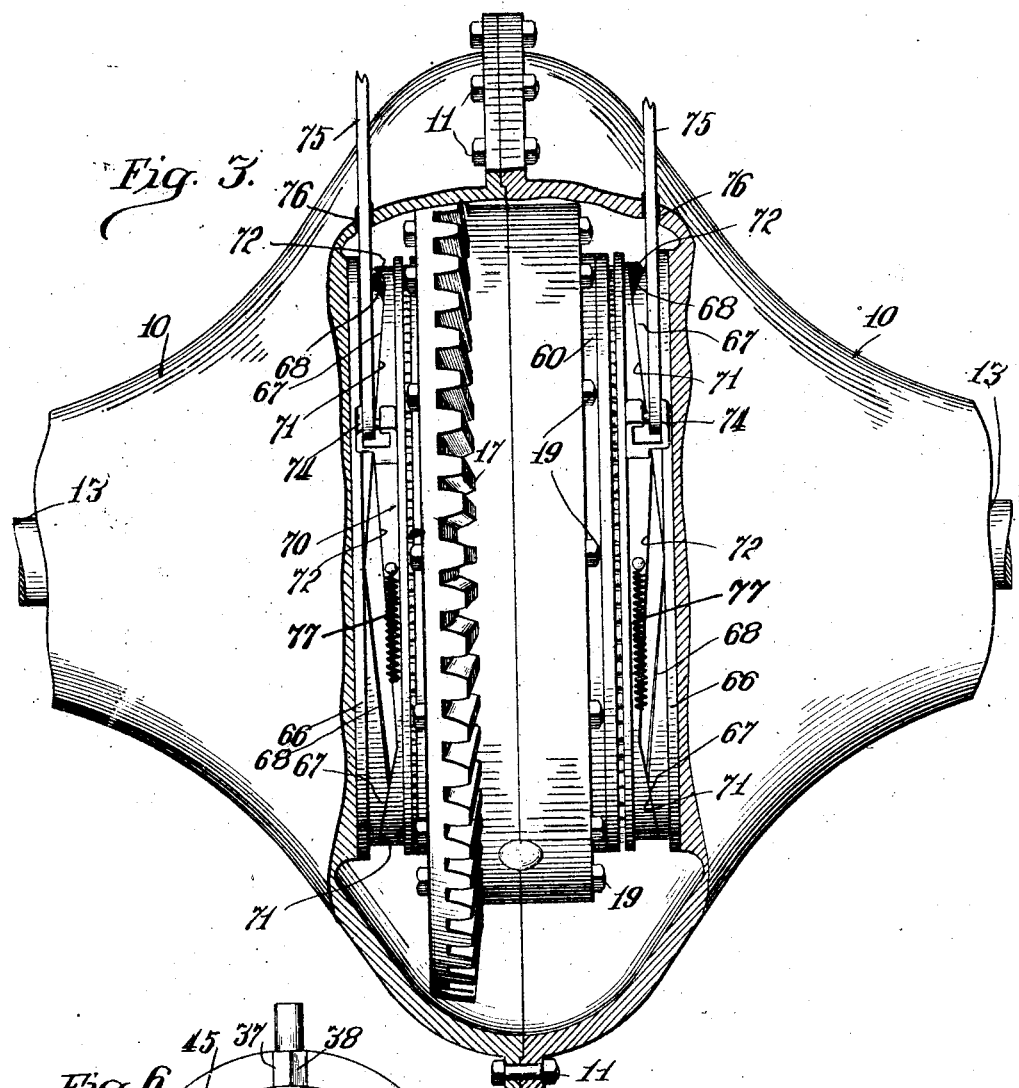
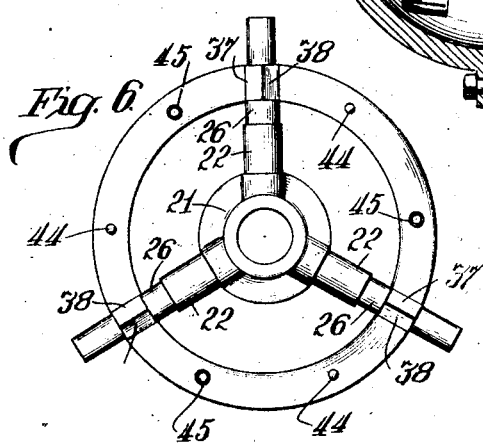
Inventor
Frank M. Lewis
By Fisher, Towle, Clapp & Soans,
Attorneys

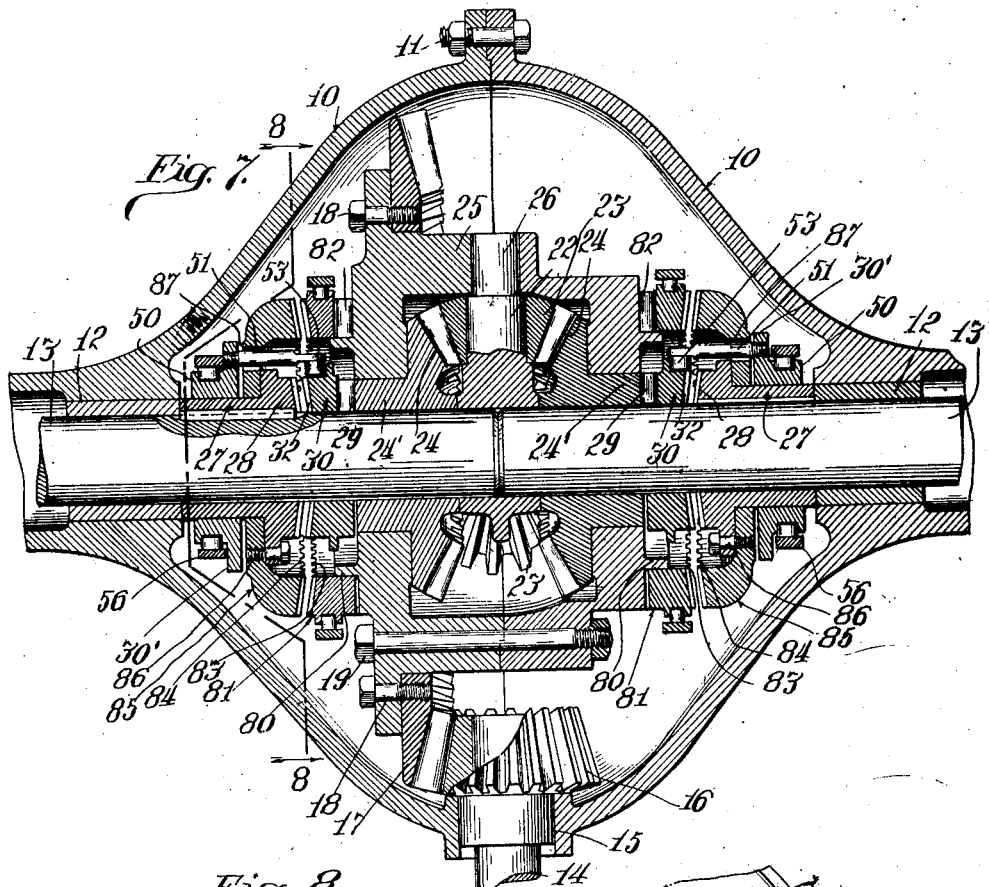

Patented Aug. 28, 1928.

1,682,386

UNITED STATES PATENT OFFICE.

FRANK M. LEWIS, OF CHICAGO, ILLINOIS.

DIFFERENTIAL MECHANISM.

Application filed April 23, 1927. Serial No. 185,972.

Most automobiles and motor vehicles are equipped with what is known as the "standard" or "equalizing" differential, consisting as to its essential parts of a rotating differential drum or housing driven from the propeller shaft by a bevel pinion or worm on the latter meshing with a bevel gear or worm wheel on the drum, and bevel pinions journaled in the drum meshing on opposite sides with bevel gears keyed to the inner ends of the two axle sections. A serious practical fault with this differential gear lies in the fact that if either wheel slips through insufficient traction, no greater power can be applied to the opposite wheel than is afforded by the traction of the slipping wheel. To obviate this fault, there have been developed various forms of what is known as a "locking" differential; that is, one which permits the overrunning of either wheel, as in the case of the "equalizing" differential, but wherein, if either wheel slips through insufficient traction, the entire power of the motor is applied to the other wheel.

One object of my present invention is to provide a construction employing both of the above-named types of differential gearing, with means whereby either gearing may be used at will, or both gearings may be disconnected from the rear axle sections, so as to permit the use of a power take-off from the propeller shaft or some other element of the transmission without the necessity of jacking up the rear axle to raise either or both of the traction wheels from the ground in order to employ the power take-off to operate an appliance that is not carried by or traveling with the motor vehicle itself.

Another object of the invention is to provide a rear axle gearing including an equalizing differential and of such a construction that the drive from the rotating drum or housing of the equalizing differential to one traction wheel can be disconnected and the power of the motor applied to the other traction wheel to rotate the latter at the same speed as the drum, instead of at double the speed and with half the power as occurs with the equalizing differential gear alone where the drive is applied with one wheel held against turning.

Other objects and attendant advantages of the invention will be apparent to persons skilled in the art as the same becomes better understood by reference to the following detailed description, taken in connection with the accompanying drawings wherein I have illustrated simple and practical embodiments of the invention, and in which—

Fig. 1 is a horizontal axial section of a rear axle gearing embodying my invention in its most complete form which includes both an equalizing differential gearing and a locking differential gearing, with manually operable means for disconnecting both gearings from the axle sections;

Fig. 2 is a vertical section through the central enlarged portion of the rear axle housing or bridge and the rotating drum of the locking differential, with parts of the latter shown in elevation at the left and in section at the right;

Fig. 3 is a top plan view, with the upper portion of the rear axle housing broken out to disclose certain cams through which the locking differential may be manually thrown out of gear on either or both sides;

Fig. 4 is a perspective elevation of one of the laterally shiftable clutch members through which the axle driving gear of the equalizing differential is drivingly coupled to its axle;

Fig. 5 is a perspective elevation of a laterally shiftable clutch shifting sleeve through which the throw-out of the shiftable clutch member shown in Fig. 4 is effected;

Fig. 6 is a side elevation of the main driving spider of both the equalizing and the standard differential gearings, showing also in inner face view one of the laterally shiftable driving clutch members of the locking differential;

Fig. 7 is a view similar to Fig. 1, showing an equalizing differential gearing in combination with mechanism for positively clutching the sides of the differential drum to and unclutching them from the respective axle sections;

Fig. 8 is a side elevation of the parts within the rear axle housing or bridge of Fig. 7, in section through one of the axles on the line 8—8 of Fig. 7, and partly broken out to disclose rearwardly lying parts.

Referring to the embodiment of the invention shown in Figs. 1 to 6 inclusive, 10 designates each of the central bell-shaped portions of the axle housing or bridge within which the differential gearings are contained, said parts being rigidly united by bolts 11 and formed with inner bearings 12 for the two axle sections 13. 14 is a propeller shaft journaled in a bearing 15 at the meeting line of the housing sections 10 and carrying a bevel pinion 16 meshing with and driving a master gear 17 that is attached by bolts 18 and 19 to a rotary drum 20 of the locking differential, the bolts 19 serving also to unite the two sections of the drum 20. Mounted on the inner meeting ends of the axle sections 13 is the hub 21 (Fig. 6) of a three-arm spider, the outer ends of the arms of the spider being secured in mating seats formed in the meeting faces of the drum sections 20, so that the spider is positively rotated by and from said drum. The inner portion of each arm of the spider is formed as a bearing 22 for one of the bevel pinions 23 of the equalizing differential; said pinions 23 meshing on opposite sides wth bevel gears 24 which in the standard equalizing differential are keyed to the axle sections, but, in this case, are loose on the axle sections. The bevel gears 24 are formed with outwardly extending hubs 24', on which are rotatably mounted the mating sections 25 of the rotating drum of the equalizing differential, the inner faces of the drum sections 25 being formed with semi-circular seats to receive round portions 26 of the spider arm lying just outwardly of the bearing portions 22.

The bevel gears 24 of the equalizing differential are drivingly connected to the axle sections 13 through mechanism which permits the drive to be disconnected or interrupted, as follows: Keyed to the axle sections 13 beyond the hubs 24' of the bevel gears 24 are a pair of driven clutch members 27 that are formed on their inner annular faces with clutch teeth 28. On the outer ends of the hubs 24' of the gears 24 are formed wedge-shaped radial lugs 29 having oppositely sloping sides constituting what I term major cams. Laterally slidable on the axle sections 13 between the gears 24 and the driven clutch members 27 are driving clutch members 30, one of which is shown in isolated detail in Fig. 4. Each of these driving clutch members 30 is formed on its inner face with radial recesses 31 formed with inclined side walls that fit the inclined side walls of the lugs 29 and corresponding in number and relative position with the latter so that the lugs 29 not only rotate the clutch members 30 but automatically cam the latter outwardly on the shaft sections. On the outer side of the clutch member 30 is a ring of clutch teeth 32 that is thereby forced into engagement with the clutch teeth 28 of the driven clutch member 27; so that the drive from the equalizing differential gear is through the gears 24, the laterally shiftable driving clutch members 30, and the driven clutch members 27 to the axle sections 13. This drive from both sides of the equalizing differential to the axle sections may be interrupted when desired by manually operated means hereinafter described.

Describing next the locking differential gear, by reference to Fig. 1 it will be seen that the ends of the drum 20 are journaled on the hubs or sleeves of the driven clutch members 27. The inner ends of the latter, just outwardly of the teeth 28 are formed with webs 33, to which are secured by bolts 34 a pair of bell-shaped members 35 that surround the opposite sides of the equalizing differential drum 25 and are formed on their inner faces with clutch teeth 36. These members 35 constitute the driven clutch members of the locking differential. The arms of the driving spider, just outside of the drum 25 are made hexagonal, to provide inclined forward driving faces 37 and inclined rearward driving faces 38. These inclined or cam portions 37 and 38 of the spider arms cooperate with correspondingly shaped notches formed in the inner faces of a pair of laterally shiftable driving clutch rings 39 that are supported on bearings formed on the central portion of the drum 25; said recesses having inclined sides 40 (Fig. 2) engaged by the inclined sides 37 of the spider arms for forward driving, and inclined sides 41 engaged by the inclined sides 38 of the spider arms for rearward driving. The laterally shiftable clutch rings 39 have on their outer sides clutch teeth 42 that cooperate with the clutch teeth 36 of the driven clutch members 35. The driving clutch rings 39 are urged into engagement with the driven clutch members 35 by thrust springs 43 (Fig. 2) between their opposed faces, and the extent of their relative turning movement is limited by pins 44 (Fig. 1) in the face of one ring engaged in relatively enlarged holes or slots 45 in the other. The cam thrust of the inclined faces of the spider arms on the correspondingly inclined walls of the recesses maintains the driving clutch members 39 in working engagement with the driven clutch members 35, but when one wheel overruns the other, the teeth on the members 35 act as cams on the teeth of the members 39 to force the latter inwardly. To effect this inward camming of the driving clutch member 39 during overrunning, it is essential to limit the rotary movement thereof (which is done by the pin 44 and hole 45) so that the rear cams 40 or 41 on the driving clutch member (with reference to the direction of rotation of the spider arms) will not, through engagement with the cooperating cam on the spider arm, oppose such inward movement. But if one wheel loses its traction and slips, the drive of the other wheel is not thereby interrupted, the entire power transmitted being in that case applied to the said other wheel.

As above stated, the drive from both sides of the equalizing differential to the axle sections may be interrupted when desired, and this is effected on each side by the following mechanism. Slidable on the end hub of the drum 20 is a circumferentially grooved collar 46, the inner face of which abuts against a plurality of push rods 47 that extend through holes 48 in the drum 20 and at their inner ends are mounted in a ring 49 itself mounted in a circumferentially grooved collar 50 slidable on the hub of the clutch member 27. On the inner face of the collar 50 are a group of inwardly extending push rods 51 (Fig. 5) extending through holes 52 in the webs 33 and carrying on their free ends rollers 53 that bear against an annular shoulder 30' on the driving clutch member 30. Pivoted at 54 in a hollow boss 55 on the axle housing 10 is a clutch shifter lever 56, the fork of which straddles the collar 46 engaging the circumferential groove of the latter, and on the lever 56 is a slidable sleeve 57 raised and lowered by a rod 58 and formed on its lower end with a tooth 59 that cooperates with the upper end of the boss 55 to lock the lever 56 in either clutch engaging or clutch disengaging position. With the two levers 56 in the position shown in Fig. 2, the equalizing differential is disconnected on both sides from the axles 13, and with the locking differential similarly disconnected, as hereinafter described, it is possible to operate a power take-off from the propeller shaft 14 or the master gear 17, if desired, when the vehicle is not moving without first removing one or both of the traction wheels or raising them from the ground.

The locking differential and its manually operable throw-out mechanism herein shown are substantially identical with a construction shown and claimed in an earlier application filed by me on the 24th day of October, 1925, Serial No. 64,496; and describing the manually operable throw-out mechanism, encircling the drum 20 a short distance outwardly on each side of its transverse median plane is a thrust or throw-out spider comprising a flat ring 60 carrying inwardly projecting pins 61 engaged with corresponding holes 62 in the central flange of the drum by which the ring 60 is slidably supported on the latter. The ring 60 is provided with inwardly directed fingers 63 (Fig. 1) that extend through holes 64 formed in the drum sections 20. The inner ends of the fingers 63 abut against an annular shoulder 39' (Fig. 2) formed on the outer side of each of the shiftable clutch members 39.

Describing next the means for actuating the thrust spiders to disengage the driving clutch members, secured to the inner face of each of the axle housing sections 10 as by means of T-bolts 65 (Fig. 1) is a cam ring 66 (Fig. 3). On the face of the cam ring 66 are a plurality of low cams 67 sloping in one direction, and a corresponding plurality of alternately disposed low cams 68 sloping in the reverse direction. The cam ring 66 is also formed with a circular inwardly projecting flange 69 (Fig. 1), on which is rotatably mounted a cooperating shiftable cam ring 70. On the outer face of the cam ring 70 are formed two groups of alternately arranged oppositely sloping cams 71 and 72 (Fig. 3) which cooperate with the cams 67 and 68 respectively under turning movements of the cam ring 70 in opposite directions. Between the inner face of each cam ring 70 and the outer face of each thrust spider 60 may be interposed an anti-friction thrust bearing 73. For operative purposes only one set of cooperating cams 67, 71 or 68, 72 is required; but each cam ring is preferably equipped with two sets of oppositely inclined cams for economy of manufacture, since in that case identical cam rings will serve either side of the device.

On the upper side of each shiftable cam ring 70 is a lug 74, to which is pivotally connected by means accommodating the lateral shifting movement of the cam ring 70 the rear end of a forwardly extending link bar 75, this latter extending through a slot or groove 76 in each housing section 20. A pull spring 77 anchored at one end to the axle housing and at its opposite end to the shiftable cam ring 70 urges the cam ring backwardly to idle or inoperative position. The forward end of each link 75 is, in practice, pivotally connected to a manually operable lever (not shown) equipped with an ordinary segment rack and locking dog within convenient reach of the driver occupying the seat of the vehicle.

To operate the above described throw-out, the link 75 is pulled forwardly, and the co-operative action of the cams 71 and 67 shifts the ring 70 inwardly, the fingers 63 of the latter, through engagement with the shoulder 39' of the driving clutch member 39, disengaging the latter from the driven clutch member 35, as shown in Fig. 1, thus disconnecting the drive of the locking differential to either or both axle sections accordingly as one or both of the links 75 are drawn forwardly. When traveling a curved path or turning a corner, wherein the outer wheel and axle overrun the inner wheel and axle, the driving clutch member on the outer side is automatically thrown out of clutch with its cooperating driven clutch member by the camming action of the teeth of the latter; the clutch engagement being automatically restored by the springs 43 and the cams 37 of the driver spider cooperating with the major cams 40 of the driving clutch members.

If it be desired to turn the vehicle on one rear wheel as a pivot, this can readily be done by disconnecting the drive of both the equalizing and the locking differential gearings on one side and maintaining the drive of said gearings on the opposite side. If it be desired to operate a power take-off from the propeller shaft 14 or the master gear 17 without the necessity of removing or jacking up the traction wheels, this can be done by disconnecting the drives of both differentials on both sides.

In Figs. 7 and 8 of the drawings I illustrate a modification representing a somewhat simpler construction from that above described, and wherein the locking differential gearing around the equalizing differential gearing previously described is replaced by an automatically engaging clutch mechanism on each side of the drum of the equalizing differential gearing with independent manually operable levers for disengaging the clutches. In these views the equalizing differential and its separable drives to the two shaft sections are the same as those shown in Fig. 1 and the parts thereof are identified by the same reference numerals. In this case, however, since the locking differential drum 20 is not used, the operating levers 56 are applied directly to the collars 50.

Describing the clutch mechanism between the sides of the equalizing differential drum 25 and the axle sections, on each outer side of the differential drum 25 is formed a circular bearing 80 on which is mounted a laterally shiftable driving clutch member 81 that is structurally and functionally similar to and encircles the driving clutch member 30 through which the rotative effort of the equalizing differential gearing is transmitted to the axle sections. The inner side of the driving clutch member 81 is formed with radial sockets having inclined sides, similar to the radial sockets 31 of the shiftable clutch member 30 shown in Fig. 4, and these sockets are engaged by radial lugs 82 having correspondingly inclined or cammed side walls 82'. The outer side of each shiftable clutch member 80 is equipped with clutch teeth 83 that are adapted to engage corresponding clutch teeth 84 on a driven clutch member 85 that is mounted on the hub of the inner driven clutch member 27 and may be secured to the latter as by screw bolts 86. The web of the driven clutch member 85 is formed with holes 87 to permit passage therethrough of the thrust rods 51. From the foregoing it will be seen that when the differential drum 25 rotates, the driving clutch members 81 will be automatically cammed outwardly by the lugs 82 into clutch engagement with the driven clutch members 85, and this drive will be transmitted to the axle sections through the inner driven clutch members 27 to which the outer driven clutch members 85 are secured.

The outer driving clutch members 81 may be held disengaged from their cooperating driven clutch members 85 by mechanism similar to that previously described, and consisting, in each case, of a clutch shifter 88, the fork of which straddles the groove in the clutch member 81, the clutch shifter lever 88 being connected to a suitable operating lever within reach of the driver and equipped with a detent, similar to that shown in Fig. 2 in connection with the lever 56, to lock the same in the clutch disengaging position against the thrust of the cam lugs 82.

When running on the equalizing differential alone, the clutch shifter 56 is released, and the clutch shifter 88 is locked to maintain the outer clutches disengaged. When running on the outer clutch mechanism alone the conditions of the two clutch shifter levers 56 and 88 are reversed; that is to say, the lever 88 is released and the drive is then through the outer clutch members 81 and 85, the lever 56 being maintained locked so as to hold the inner clutch members 30 and 27 separated. If desired, both clutch shifter levers may be released, and the drive will then be distributed through the equalizing differential mechanism and the outer clutch drive. On the other hand, with both clutch shifter levers locked, both drives are disconnected, as shown in Fig. 7, and the mechanism is in a condition to permit the operation of a power take-off from the propeller shaft without removing or jacking up the traction wheels driven by the axle sections 13.

This apparatus can also be manipulated to effect a turning movement of the vehicle on one wheel as a pivot by simply disconnecting the drives on one side. This can also be done with the mechanism shown in Figs. 1 to 6 inclusive. In both cases, where this is done, the speed of the drive on the outer wheel is in a one to one ratio to the speed of the differential gear, instead of in a two to one speed ratio as in the case of the standard equalizing differential when the inner wheel is held against turning.

Both of the automatically engaging clutch mechanisms herein shown and described are substantially like that disclosed and claimed in an earlier application filed by me April 12, 1926, Serial No. 101,298 in which application said clutch mechanism is shown embodied in rear and side power take-offs.

In construing the claims hereunto appended, it is to be understood that the embodiments of the invention herein shown and described are illustrative only and not limiting, and may be variously modified and changed as special circumstances and equipments may require without involving any departure from the principles involved or sacrificing any of the advantages and utilities secured by the invention.

I claim—

1. In a power transmitting mechanism, the combination with alined shaft sections, of an equalizing differential gearing mounted on said shaft sections, means drivingly connecting said gearing to said shaft sections, a clutch mechanism mounted on and connected to said shaft sections, a driving means common to both said differential gearing and said clutch mechanism, means for rendering idle said connecting means, and means for rendering idle said clutch mechanism.

2. In a power transmitting mechanism, the combination with alined shaft sections, of an equalizing differential gearing mounted on said shaft sections, clutch mechanism connecting said gearing to said shaft sections, other clutch mechanism encircling said differential gearing and connected to said shaft sections, a driving means for said differential mechanism and said other clutch mechanism common to both, and independent means for operating said respective clutch mechanisms.

3. In a power transmitting mechanism, the combination with alined shaft sections, of an equalizing differential gearing mounted on said shaft sections, independent clutches connecting both sides of said gearing to the respective shaft sections, other independent clutches encircling said differential gearing and connected to the respective shaft sections, a driving means for said differential gearing and said other clutches common to both, and independently operable means for shifting said clutches.

4. In a power transmitting mechanism, the combination with alined shaft sections, of an equalizing differential gearing mounted on said shaft sections, independent automatically engaging clutches connecting both sides of said gearing to the respective shaft sections, other independent automatically engaging clutches encircling said differential gearing and connected to the respective shaft sections, a driving means for said differential gearing and said other clutches common to both, and independently operable means for disengaging said clutches.

5. In a differential mechanism for transmitting power, the combination with alined shaft sections, of an equalizing differential gearing including a pair of gears rotatably mounted on the inner ends of said shaft sections, driven clutch members keyed to said shaft sections, driving clutch members on said shaft sections between the hubs of said gears and said driven clutch members, cooperating means on said hubs and said driving clutch members by which the latter are rotated and shifted into engagement with said driven clutch members, and manually operable means for disengaging said driving and driven clutch members.

6. In a differential mechanism of the character described, the combination with alined shaft sections, of an equalizing differential mechanism mounted on said shaft sections, a locking differential mechanism mounted on said shaft sections, means for rotating said mechanisms, means drivingly connecting both said mechanisms to said shaft sections, and means for disconnecting the drives of either or both said mechanisms to said shaft sections.

7. In a differential mechanism of the character described, the combination with alined shaft sections, of an equalizing differential mechanism mounted on said shaft sections, a locking differential mechanism mounted on said shaft sections, means for rotating said mechanisms, means drivingly connecting the opposite sides of both said mechanisms to the respective shaft sections, and means for disconnecting the drives of either or both said mechanisms to said shaft sections.

8. In a differential mechanism of the character described, the combination with alined shaft sections, of an equalizing differential mechanism mounted on said shaft sections, a locking differential mechanism mounted on said shaft sections, means for rotating said mechanisms, automatic means drivingly connecting the opposite sides of said equalizing mechanism to the respective shaft sections, other automatic means for drivingly connecting the opposite sides of said locking mechanism to the respective shaft sections, and means for rendering either or both of said automatic means inoperative.

9. In a differential mechanism of the character described, the combination with alined shaft sections, of an equalizing differential mechanism mounted on the proximate ends of said shaft sections, a locking differential mechanism surrounding said equalizing mechanism, a rotating means for said mechanisms common to both, and disconnectible means for transmitting the rotative movements of both said mechanisms to said shaft sections.

10. In a differential mechanism of the character described, the combination with alined shaft sections, of an equalizing differential mechanism mounted on the proximate ends of said shaft sections, a locking differential mechanism surrounding said equalizing mechanism, a rotating means for said mechanisms common to both, means, including automatically engaging clutch members, for transmitting the rotative movements of both said mechanisms to said shaft sections, and manually operable means for disengaging said clutch members.

FRANK M. LEWIS.